(12) United States Patent
Lee (10) Patent No.: US 9,414,023 B2
(45) Date of Patent: Aug. 9, 2016

(54) METHOD AND SYSTEM FOR INTERFACING CONTENT BETWEEN DEVICES

(75) Inventor: Sean S. Lee, Rockville, MD (US)

(73) Assignee: The DIRECTV Group, Inc., El Segundo, CA (US)

(*) Notice: Subject to any disclaimer, the term of this patent is extended or adjusted under 35 U.S.C. 154(b) by 1539 days.

(21) Appl. No.: 12/436,695

(22) Filed: May 6, 2009

(65) Prior Publication Data

US 2009/0282449 A1   Nov. 12, 2009

Related U.S. Application Data

(60) Provisional application No. 61/050,758, filed on May 6, 2008.

(51) Int. Cl.
| | | |
|---|---|---|
| *H04N 7/173* | (2011.01) | |
| *H04N 21/218* | (2011.01) | |
| *H04N 21/2343* | (2011.01) | |
| *H04N 21/438* | (2011.01) | |
| *H04N 21/4402* | (2011.01) | |
| *H04N 21/462* | (2011.01) | |
| *H04N 21/61* | (2011.01) | |
| *H04N 21/63* | (2011.01) | |
| *H04N 21/647* | (2011.01) | |

(52) U.S. Cl.
CPC ..... *H04N 7/17318* (2013.01); *H04N 21/21815* (2013.01); *H04N 21/2343* (2013.01); *H04N 21/234309* (2013.01); *H04N 21/4381* (2013.01); *H04N 21/4402* (2013.01); *H04N 21/440218* (2013.01); *H04N 21/440236* (2013.01); *H04N 21/4622* (2013.01); *H04N 21/6125* (2013.01); *H04N 21/632* (2013.01); *H04N 21/64707* (2013.01)

(58) Field of Classification Search
None
See application file for complete search history.

(56) References Cited

U.S. PATENT DOCUMENTS

| | | | |
|---|---|---|---|
| 2002/0170062 A1* | 11/2002 | Chen et al. | 725/86 |
| 2003/0140121 A1* | 7/2003 | Adams | 709/219 |
| 2004/0214556 A1* | 10/2004 | Yamada | 455/414.3 |
| 2006/0036672 A1* | 2/2006 | Cha et al. | 709/202 |
| 2007/0136440 A1 | 6/2007 | Sutardja | |
| 2007/0150926 A1* | 6/2007 | Zuo | H04N 21/4402 725/131 |

(Continued)

FOREIGN PATENT DOCUMENTS

| | | |
|---|---|---|
| EP | 1387281 A1 | 2/2004 |
| EP | 1626557 A1 | 2/2006 |

OTHER PUBLICATIONS

International Search Report and Written Opinion dated Sep. 3, 2009 in International Patent Application No. PCT/US2009/042867 filed May 5, 2009 by Sean S. Lee.

*Primary Examiner* — Brian T Pendleton
*Assistant Examiner* — Dika C. Okeke
(74) *Attorney, Agent, or Firm* — Harness, Dickey & Pierce, P.L.C.

(57) ABSTRACT

A communication interface device and method for operating the same includes a communication module receiving a request for a content list from a first user device and a list module generating a content list. The communication module communicates the content list device to the first user device and receives a content selection from the user device. A control module initiates a transfer of content corresponding to the content selection from a content storage device. The communication module receives the content at the communication interface device from the content storage device and communicates the content to the first user device.

43 Claims, 6 Drawing Sheets

(56) References Cited

U.S. PATENT DOCUMENTS

| | | | |
|---|---|---|---|
| 2007/0157260 A1* | 7/2007 | Walker | 725/86 |
| 2007/0288967 A1 | 12/2007 | Candelore et al. | |
| 2008/0022341 A1* | 1/2008 | Walter | H04N 21/4622 725/110 |
| 2008/0148329 A1* | 6/2008 | Costa et al. | 725/109 |
| 2008/0168524 A1* | 7/2008 | Wood et al. | 725/134 |
| 2008/0259941 A1* | 10/2008 | Zhao et al. | 370/401 |
| 2009/0138923 A1* | 5/2009 | Kim et al. | 725/87 |
| 2009/0235317 A1* | 9/2009 | Igarashi | 725/82 |
| 2011/0185045 A1* | 7/2011 | Rieger | 709/219 |

* cited by examiner

METHOD AND SYSTEM FOR INTERFACING CONTENT BETWEEN DEVICES

TECHNICAL FIELD

The present disclosure relates generally to communication systems, and more particularly, to a method and system for communicating data through a network.

BACKGROUND

The statements in this section merely provide background information related to the present disclosure and may not constitute prior art.

Communication systems such as pay or subscription communication systems include a primary service provider and a user receiver device such as a set top box or integrated receiver decoder. The user device is typically provided with authorization to communicate with the primary service provider and receive services therefrom. One example of such a system is a satellite television system such as DIRECTV®. Broadcast television channels and other internal programs are provided by the primary service provider.

The variety of content sources has continued to increase. The content users for a particular system only have access to content capable of being decoded by the particular system. Web-based content is one example of the increased amount of content available. Typically, a set top box is not capable of receiving web-based content.

SUMMARY

The present disclosure provides a system and method for allowing a user device such as a set top box to access various types of content from various sources. These sources include external sources such as web-based sources as well as other sources within an internal network.

In one aspect of the disclosure, a method includes receiving a request for a content list at a communication interface device from a user device, communicating the content list from the communication interface device to the first user device, receiving a content corresponding to content on the content list, initiating a transfer of content corresponding to the content selection from a content storage device to the communication interface device, receiving the content at the communication interface device from the content storage device and communicating the content to the first user device.

In another aspect of the disclosure, a communication interface device includes a communication module receiving a request for a content list from a first user device and a list module generating a content list. The communication module communicates the content list device to the first user device and receives a content selection from the user device. A control module initiates a transfer of content corresponding to the content selection from a content storage device. The communication module receives the content at the communication interface device from the content storage device and communicates the content to the first user device.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Further, while the following disclosure is made with respect to the delivery of content (e.g., television (TV), movies, games, music videos, etc.), it should be understood that the systems and methods disclosed herein could also be used for delivery of any media content type, for example, audio, music, data files, web pages, games, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein. As used herein, the term title or program will be used to refer to, for example, a media content type such as a movie itself and not the name of the movie.

Figure 1:
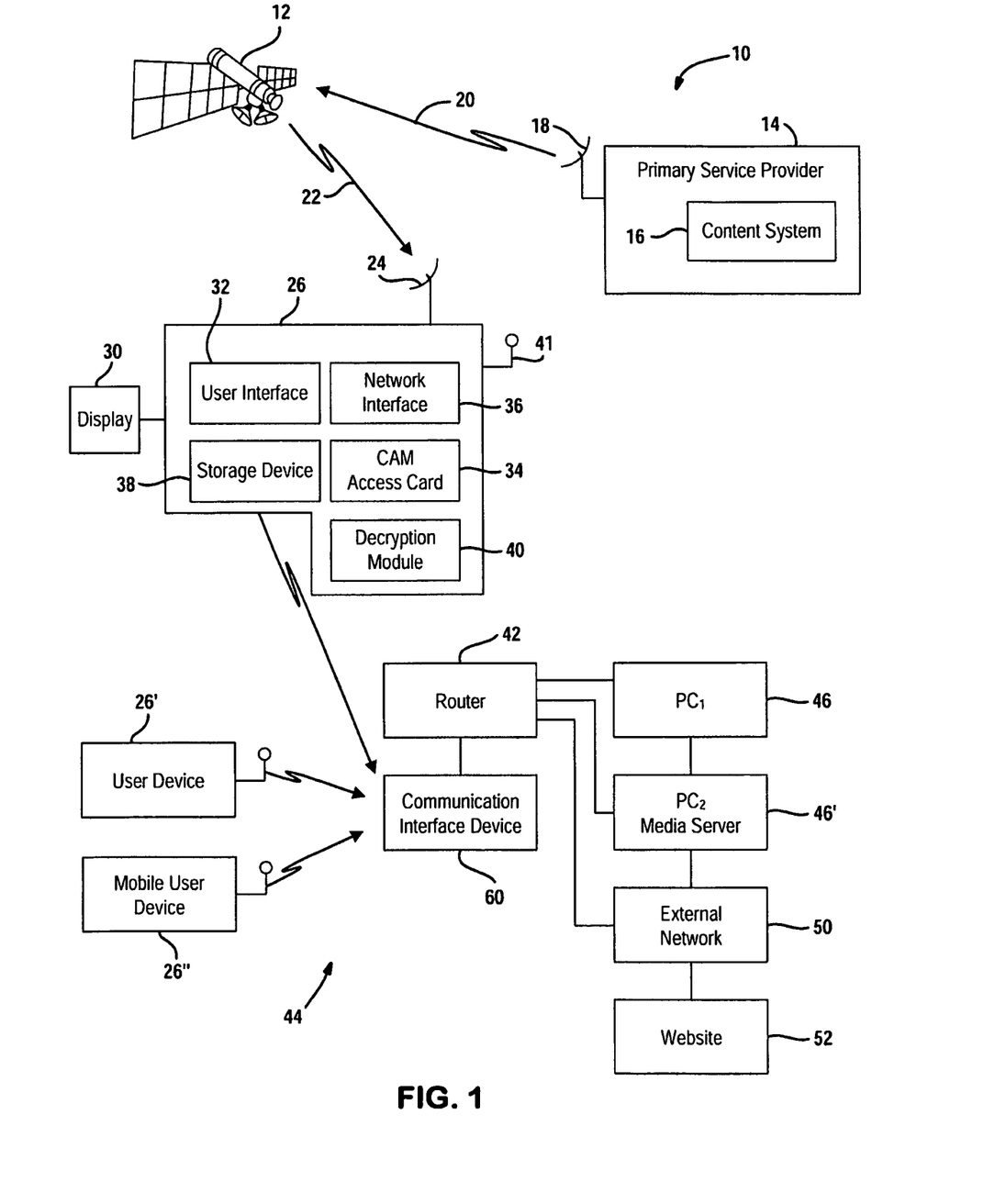
FIG. 1 is a block diagrammatic view of a satellite communication system according to the present disclosure.

Referring now to FIG. 1, a satellite television broadcast system 10 is illustrated. The satellite television broadcast system 10 is illustrated by way of example. However, the present disclosure is not so limited as mentioned above. The television broadcast system 10 includes a satellite 12 that receives content or programming from a primary service provider 14. More specifically, the primary service provider 14 includes a content system 16 that generates uplink signals 20 corresponding to the content through an uplink antenna 18. As mentioned above the content may be various types of content including but not limited to live content, recorded content, pay-per-view content and on-demand content. The uplink signals 20 may be television signals and more specifically digital television signals associated with various channels. The uplink signals 20 may also be data including but not limited to interactive television data and program guide data. The uplink antenna 18 communicates the uplink signals 20 to the satellite 12 which in turn generates downlink signals 22. The downlink signals 22 are communicated to a receiving antenna 24 on a user device 26. A second user device 26' and a third user device 26" are illustrated. Each of the user devices 26' and 26" may be configured with the same internal components as user device 26.

The user devices 26-26" may include a satellite television receiver, set top box or a digital video recorder. The satellite television receiver may also be referred to as an integrated receiver decoder (IRD). Of course, other types of user devices may be used such as a cable television set top box. Other types of user devices may include a mobile device such as a laptop computer, cellular phone, personal digital assistant, a portable media player or an automotive-based television receiving device. Thus, the user devices 26-26" may be a fixed user device in the case of a satellite television set top box or a mobile user device. Both fixed and mobile devices may be used in a system.

The uplink signals 20 and downlink signals 22 may be referred to as communication signals. Communication signals are wireless communication signals and may include various types of entertainment content, data, traffic, weather, hazardous material warnings, advertising material, guide data and the like. As mentioned above, this system may be suitable for wired systems such as cable televisions and terrestrial wireless systems.

The user device 26 may be associated with a display 30 for displaying content and programming, as well as displaying various types of user commands, content lists or the like. The display 30 may be a monitor, a television or a display integrated into the device. The display 30 may include speakers for an audio display. The display 30 may be used for displaying primary content from a primary service provider and secondary content from a secondary service provider.

The user device 26 may include a user interface 32, such as a keyboard, remote control, or the like, for selecting and entering various types of information by the user.

The user device 26 may also include a conditional access module 34 that allows the user to access the programming provided from the content system 16. The conditional access module 34 may be referred to as an access card. The conditional access module 34 may include various activation codes without which the user device 26 is not activated. The conditional access module 34 may include a conditional access module identifier such as a number or a code.

The user device 26 may also include a network interface 36 for interfacing with a network 40. For example, the network interface 36 may communicate wirelessly through the antenna 41 or through a direct connection such as an Ethernet connection. The network interface 36 may be but is not limited to a wireless broadband interface, a broadband interface, a modem-type interface or a public-switched telephone network interface.

The user device 26 may also include a storage device 38. The storage device 38 may store various content received from the primary service provider or through a local network. The content may be received through the satellite 12 or through the network through the network interface 36. The storage device 38 may be a hard disk drive or memory chip-based device. The storage device 38 may be referred to as a digital video recorder.

The user device 26 may also include a decryption module 40. The decryption module 40 may locally decrypt information received through a local network. Decryption may take place using various types of encryption and decryption, including digital transmission content protection (DTCP).

The user devices 26-26" may be in communication with a router 42. The router and the user devices may form an internal network 44. The router 42 may also be in communication with other devices which form part of the internal network 44 such as personal computers 46 and 46'. At least one of the personal computers 46-46' may be a media server. The internal network 44 may be a wired or wireless network.

The router 42 may also be in communication with an external network 50. The external network may communicate with various web servers 52 that communicate website content through the external network 50 and to the router 42. The web servers 52 may include websites content which may include various types of audio, visual and other types of content such as those described above.

The router 42 may also be in communication with a communication interface device 60. The communication interface device 60 may be attached to the user devices 26-26" through the internal network 44. The network 44 may be an Ethernet-type network. The communication interface device 60 may have transcoding capabilities so that media may be transcoded or content may be transcoded into various formats suitable for use by the user devices 26-26". The communication interface device 60 may be used to communicate content or media from one user device to another user device or from the external network to one of the user devices. Likewise, the communication interface device 60 may also communicate content or media from one of the personal computers 46 or a media server to the user device and vice versa. In one example, a user device that desires content may communicate directly with the communication interface device 60. The communication interface device communicates with another user device, a PC or media server through the router to obtain the desired content. Details of this will be set forth below.

Figure 2:
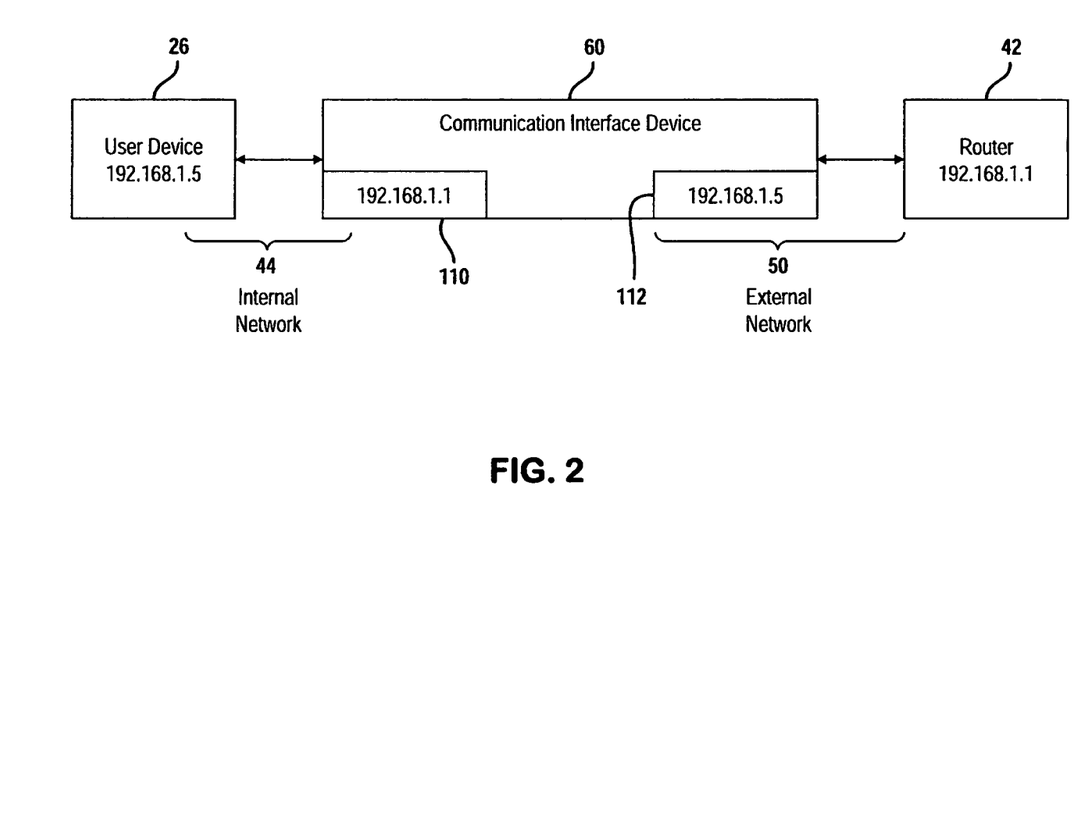
FIG. 2 is a simplified block diagrammatic view of the communication interface device, a user device and a router having IP addresses.

Referring now to FIG. 2, the communication interface device 60 is illustrated in communication with a user device 26 and the router 42. The communication interface device 60 has a dual Ethernet interface that includes a first interface 110 and a second interface 112. The first interface 110 includes an internet protocol (IP) address such as 192.168.1.1, whereas the second interface includes a second IP address such as 192.168.1.5. The first IP address in the first interface corresponds to the IP address of the router 42, whereas the second IP address corresponds to the IP address of user device 26. As is illustrated in FIG. 2, one user device 26 is set forth. Each user device is connected to its own communication interface device 60. IP traffic to and from the internal network and to and from the external network will be forwarded through the router 42. Content streaming will be processed by the communication interface device 60 and transcoded into various types of formats as will be described below. The router 42 is the interface to a local area network such as the internal network. The communication interface device 60 may also use dynamic host configuration protocol (DHCP) to obtain an IP address and announce itself to all the devices within the local area network using universal plug and play (UPnP) protocol. The router 42 may also provide links to an external network 50 so that content from various websites is provided.

The device may also communicate like a shared network printer with multiple devices. In such a case FIG. 2 is inapplicable. The communication interface device will have one network interface that any user device can access while it is available. When used by multiple devices, the list formed may include all content from all the devices in the network.

Figure 3:
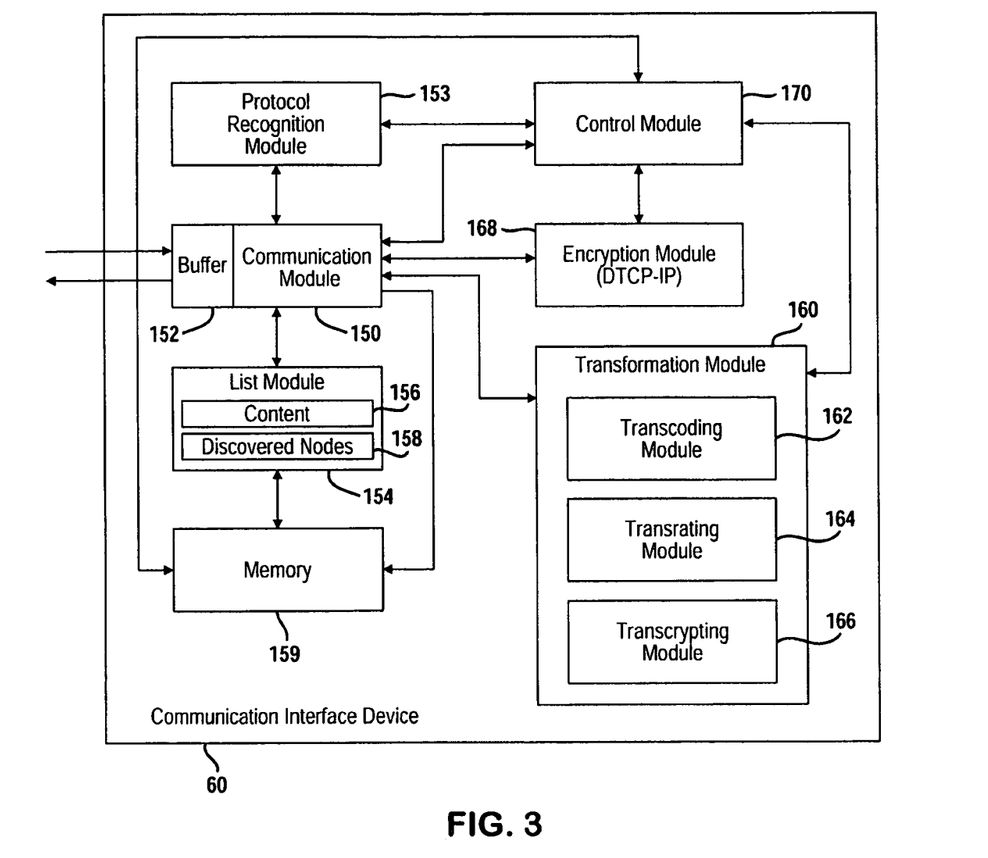
FIG. 3 is a block diagrammatic view of a communication interface device.

Referring now to FIG. 3, a communication interface device 60 is illustrated in further detail. The communication interface device 60 receives and transmits various information such as lists and content. A communication module 150 may be used to communicate with various user devices and with the router. The communication module 150 may include a buffer 152 used for buffering signals into and out of the communication module 150. The buffer 152 may be a first-in-first-out (FIFO) buffer. The communication module 150 may be in communication with a protocol recognition module 153. The protocol recognition module 153 may provide the communication module 150 with means for recognizing various types of protocols and distinguishing between various types of protocols.

The protocol recognition module 153 examines the listings of content that it finds (in the local network or the external network) and determines the format that the content is in. The protocol recognition module 153 also knows the formats that are accepted by the user device and knows the conversions that it can perform on certain input formats to certain output formats. Based on these considerations the protocol recognition module 153 determines whether or not the content should be displayed in the content listing to the user device. Thus a secondary list of content less than the complete list of content available may be displayed or provided.

The protocol recognition module 153 may be used to distinguish the protocols of the signals received. For example, the protocol recognition module may distinguish between internet protocol signals and Universal Plug and Play (UPnP) protocol signals. The UPnP protocol is promulgated by the UPnP Forum. UPnP can run on media that can support IP including Ethernet, FireWire, IrDa, home wiring (G.hn), and RF (Bluetooth and WiFi).

The communication module 150 may also be in communication with a list module 154. The list module 154 may include lists of content 156 and lists of discovered nodes 158. The list module 154 may initiate obtaining a list of content from the discovered nodes 158. The list module 154 may obtain lists from the various user devices associated with the communication interface device 60 and from various websites. The websites may include various numbers of websites and may also be restricted to a limited number of preselected websites providing content.

A memory 159 may be used to store the various lists such as the discovered node list and a content list therein. The memory 159 may be various types of memory, including flash memory, hard disk drive memory, or other types of volatile or non-volatile memory.

The communication interface device 60 may also include a transformation module 160 for transforming the content based on the recognition performed by the protocol recognition module 153. The transformation module 160 may include a transcoding module 162 for transcoding content received in a first type of encoding into a second type of encoding. A transrating module 164 may also be included within the transformation module 160. The transrating module 164 may change the speed of a received content. For example, the bit rate may be reduced.

The transformation module 160 may also include a transcrypting module 166. The transcrypting module 166 may be used to transcrypt or change the encryption from one type of encryption to a second type of encryption for content communicated through the communication interface device.

An encryption module 168 may also be included within the communication interface device 60. The encryption module 168 may encrypt communication between the communication interface 60 and the user device 26. The encryption module 168 may also act to decrypt content signals from a user device. The encryption module may, for example, use DTCP-IP for its encryption protocol. The DTCP protocol allows secure communication between the communication interface device and the various user devices without allowing the communication interface device to communicate protected content to external devices through the router 42. The DTCP protocol provides copyright protection.

A control module 170 may be in communication with the various modules 150-166 within the communication interface device 60. The control module 170 may control various functions including the timing of various functions. The control module 170 may, for example, initiate the transfer of content, control the timing of generating lists, and perform various decisions such as determining the optimum transformation settings.

Figure 4:
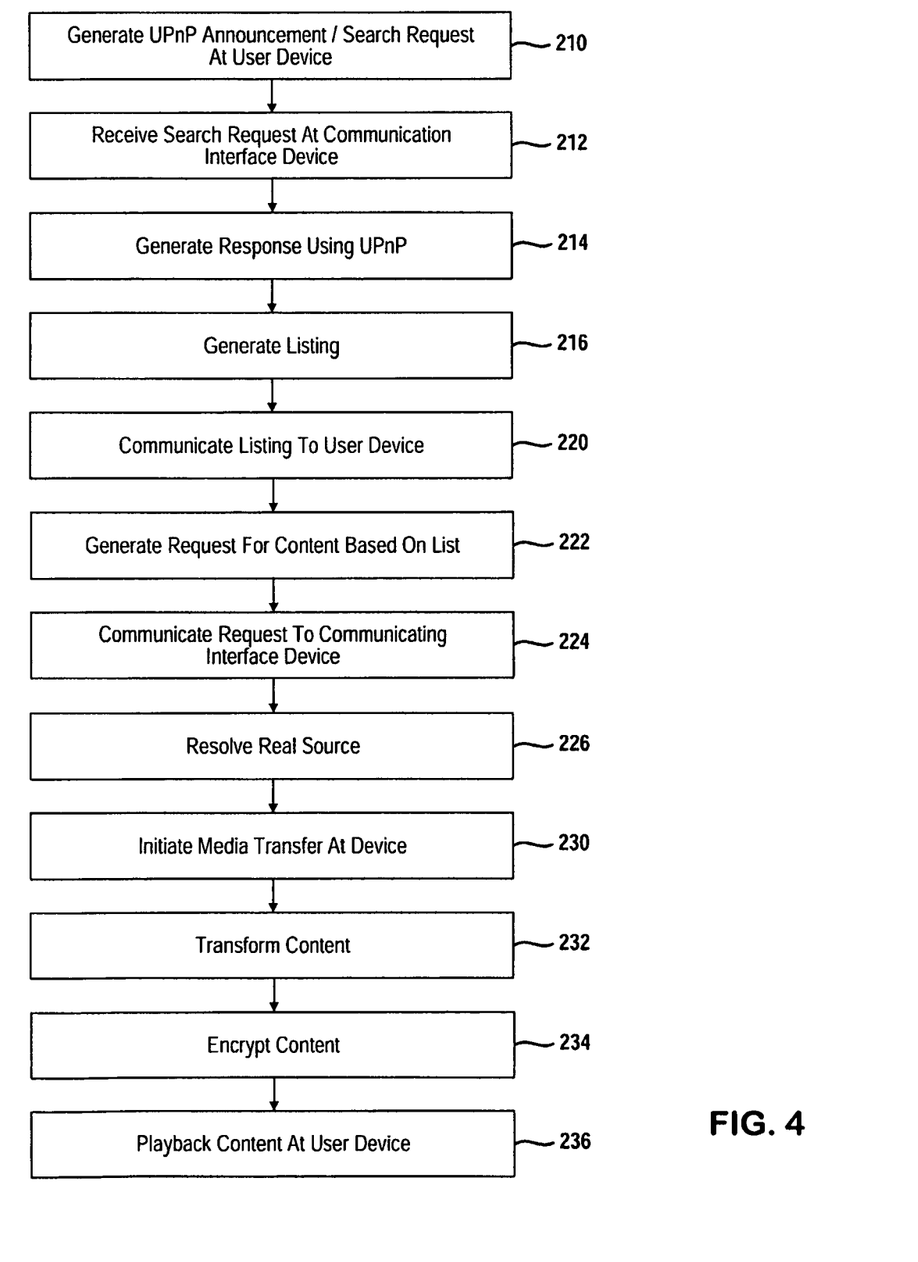
FIG. 4 is a flowchart of a method of communicating content between the communication interface device and the user device.

Referring now to FIG. 4, a method for operating the communication interface device is illustrated. In step 210, a universal plug and play announcement and a search request may be generated at the user device. The user associated with the user device may use the user interface associated with the user device to generate various search requests. The announcements may be generated within the user device based upon the search request. In step 212, the search request such as a request for a content list is received at the communication interface device. The search request being in a first protocol, such as universal plus and play, is acted upon by the communication interface device rather than forwarded or passed through when in a different format such as IP format. Other types of messages such as internet protocol messages may be passed directly through the communication interface device and to the router. Thus, the communication interface device distinguishes between various types of protocols used in various types of signals.

In step 214, a response may be generated using a universal plug and play protocol to the transmitting user device. In step 216, a listing may be generated. The listing may be generated in response to a search request or may be pre-generated based upon various searching types of protocols. The listing data may be retrieved from the user devices associated with the communication interface device and from various websites. The retrieving may be done upon request or done at various times so that the listing data is readily available without delay. As mentioned above, the websites may be pre-selected as known to include content. The preselection of websites may be performed by the service-providing company, the user or a combination of both. The listing may be stored within the communication interface device. In one example, a complete list of content available for transfer with the acceptable content parameters may be determined. The complete list may be gathered from all available sources. From the complete list of content, a secondary list of content corresponding to content that the communication interface device can convert to the content parameters or can pass through unconverted that already have acceptable content parameters for the user device is generated. The secondary list may then be communicated to the secondary list.

In step 220, the listing data is communicated from the communication interface device to the user device. The listing data may thus be displayed on the display associated with the user device. The listing data may be a simple list of titles or various other data associated with the content title. Examples include category, content type, location channel identifier and other data. One example is provided in FIG. 5.

In step 222, a request for content signal based upon selecting an entry in the list may be generated. The user device may select a selection by operating the user interface associated with the user device. In step 224, the request for content signal is communicated to the user interface device from the user device. The request may also be communicated using a first format such as a Universal Plug and Play (UPnP) protocol. The request may merely include a particular content selection or content selection identifier. In step 226, the real source of the content may only be known by the communication interface device. The user of the user interface may not know whether the particular content lies in another content storage device within the internal network or on an external network. The content may also be stored within a media server. Resolving the real source allows an identifier associated with the content to be used to initiate a request to transfer content.

In step 230, a media transfer may be initiated at the communication interface device 230. A request from the communication interface may include an identifier associated with the content to be transferred.

In step 232, if required, the content may be transformed. Various types of transformation may take place, including transcoding the content, transrating the content, transcrypting the content or a combination or sub-combination of any of the above. The content may also be in the desired format at the desired speed with the desired encryption and thus no content transformation may be performed.

In step 234, another optional step is performed. The communication interface device 60 may communicate the content signals using encryption such as the DTCP encryption described above. This keeps the content secure between the communication interface and the various user devices.

In step 230, the content may be played back at the user device 230. The content may be streamed directly from a website or from another user device to the using user device. The content may also be stored within the user device for later use. The content may be stored within the storage medium such as a DVR within the user device and used at a later time. Ultimately, the content is desired to be played back at the user device.

Figure 5:
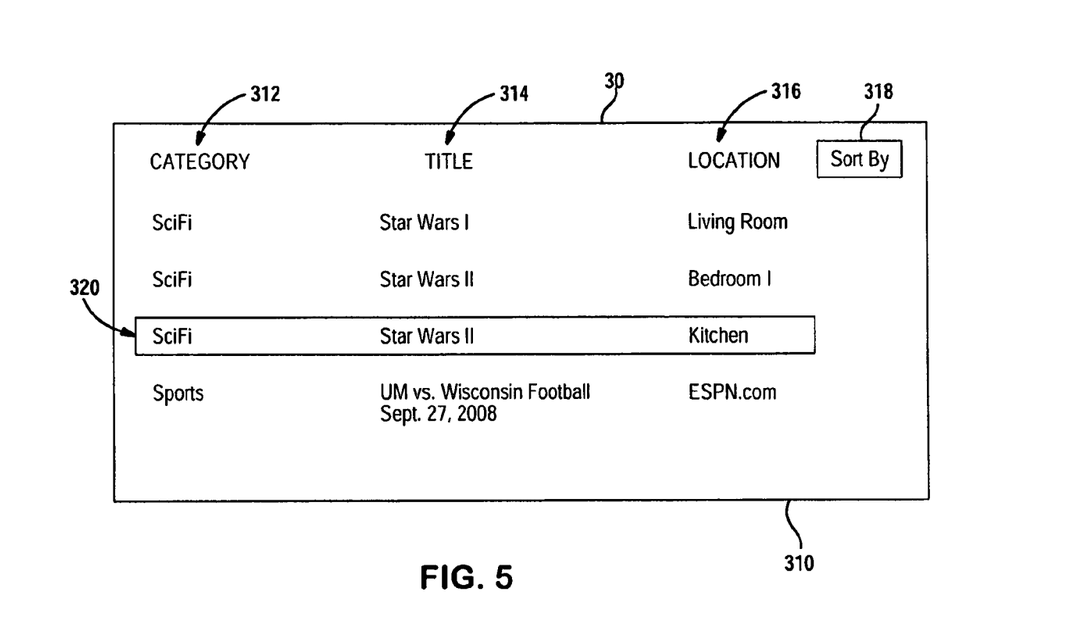
FIG. 5 is a graphical user interface on a display.

Referring now to FIG. 5, the display 30 illustrating a graphical user interface 310 is illustrated. The graphical user interface 310 may include various types of content. Three different headings have been used in the present example. However, various other headings may also be used. In this example, a column corresponding to a category 312 is set forth. By providing a category 312, the user may sort the different types of content into various types of categories by using the sort by button 318. In the following example, the first three elements of the graphical user interface 310 include science fiction (SciFi) as the category. The fourth entry includes a sports category. The title 314 may also be provided within the graphical user interface 310. In this example, Star Wars I, Star Wars II and Star Wars III are all provided as titles of movies available from other locations. The fourth title is a sports title corresponding to the University of Michigan vs. Wisconsin football game played on Sep. 27, 2008.

The location 316 may also be provided within the graphical user interface 310. The location may include the location within the network or external network. In this example, the first graphical user interface title is available from the living room, the second item from the bedroom and the third item from the kitchen. The fourth item is available at a website such as ESPN.com. The location may not be displayed to the user and thus the user may be oblivious to the particular location of the content. The content may also be within media servers or other devices. Other suitable headings may be a channel of origination setting, the time originally aired, the network associated therewith, or other types of identifiers.

Box 320 corresponds to a selection for a particular content by activating a user interface. The selection box may be moved and selected.

Figure 6:
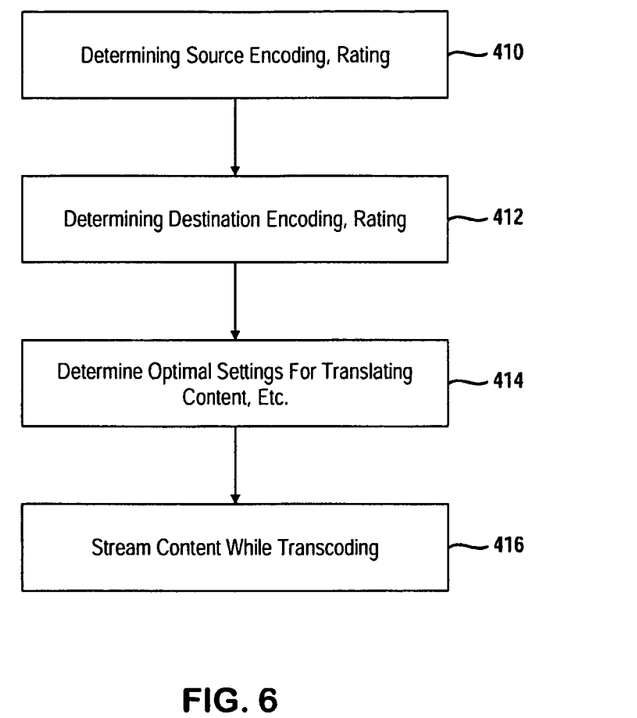
FIG. 6 is a method for transforming data.

Referring now to FIG. 6, a method for transforming the content is set forth. In step 410, the source may be determined. The source encoding, rating and encryption may all be determined in step 410. In step 412, the destination encoding may be determined. The destination determination may include various types of encoding or rating associated with the user device. Destination encoding may be communicated to the communication interface device during establishing the communication interface device. In step 414, optimal settings for encoding, encrypting, transrating may be determined based upon the user device and the source characteristics. In step 416, the content may be streamed while transcoding to the user device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:
1. A method comprising:
communicating a plurality of communication signals from a first user device to a communication interface device using at least one of a first communication protocol and a second communication protocol, said communication interface capable of recognizing incoming signals using the first communication protocol and the second communication protocol;
communicating a first communication signal of the plurality of communication signals using the first communication protocol;
recognizing the first communication protocol at the communication interface device and communicating the first communication signal to a router without changing the first communication protocol of the first communication signal;
communicating a second communication signal of the plurality of communication signals corresponding to a request for a content list from the first user device to the communication interface device using the second communication protocol different than the first communication protocol;
receiving the request for the content list from the first user device at the communication interface device;
communicating the content list from the communication interface device to the first user device;
receiving a content selection corresponding to content on the content list;
initiating a transfer of content corresponding to the content selection from a content storage device remotely located from the first user device and the communication interface device to the communication interface device through a network;
receiving the content at the communication interface device from the content storage device through the network; and communicating the content to the first user device from the communication interface device through the network.

2. A method as recited in claim 1 wherein the second communication protocol comprises a Universal Plug and Play protocol.

3. A method as recited in claim 1 wherein the first protocol comprises an Internet protocol.

4. A method comprising:
assigning a first IP address to a first user device and a second IP address to a router;
assigning a user device interface at a communication interface device to the second IP address and the router to the first IP address;
receiving a request for a content list from a first user device at a communication interface device;
communicating the content list from the communication interface device to the first user device;
receiving a content selection corresponding to content on the content list;
initiating a transfer of content corresponding to the content selection from a content storage device remotely located from the first user device and the communication interface device to the communication interface device through a network;
receiving the content at the communication interface device from the content storage device through the router; and
communicating the content to the first user device from the communication interface device through the network.

5. A method as recited in claim 4 wherein receiving the content at the communication interface device comprises receiving the content through the router from an internal network.

6. A method as recited in claim 4 wherein receiving the content at the communication interface device comprises receiving the content through the router from an external network.

7. A method as recited in claim 4 wherein receiving the request for the content list at the communication interface device from the first user device comprises receiving the request for the content list at the communication interface device from a first set top box.

8. A method as recited in claim 7 wherein receiving the content at the communication interface device from the content storage device comprises receiving the content at the communication interface device from a second set top box.

9. A method as recited in claim 4 wherein receiving the request for the content list at the communication interface device from the first user device comprises receiving the request for the content list at the communication interface device from a mobile user device.

10. A method as recited in claim 4 wherein receiving the request for the content list at the communication interface device from the first user device comprises receiving the request for the content list at the communication interface device from a fixed user device.

11. A method as recited in claim 4 further comprising generating the content list from an internal network.

12. A method as recited in claim 4 further comprising generating the content list from an internal network comprising the first user device and a second user device.

13. A method as recited in claim 4 further comprising generating the content list from an internal network comprising the first user device and a second user device and an external network comprising a web server.

14. A method as recited in claim 4 wherein receiving the content at the communication interface device from the content storage device comprises receiving the content at the communication interface device from a second user device.

15. A method as recited in claim 4 wherein receiving the content at the communication interface device from the content storage device comprises receiving the content at the communication interface device from a media server.

16. A method as recited in claim 4 wherein receiving the content at the communication interface device from the content storage device comprises receiving the content at the communication interface device from a web server through an external network.

17. A method as recited in claim 4 wherein prior to communicating the content to the first user device, transforming the content.

18. A method as recited in claim 17 wherein transforming the content comprises changing the content from a first encoding format into a second encoding format.

19. A method as recited in claim 18 further comprising encrypting the content in the second encoding format.

20. A method as recited in claim 17 wherein transforming the content comprises changing the content from first encrypting format into a second encrypting format.

21. A method as recited in claim 17 wherein transforming the content comprises changing the content from first a first bit rate to a second bit rate.

22. A method as recited in claim 17 wherein transforming the content comprises changing the content from a first encoding format into a second encoding format and changing the content from first encrypting format into a second encrypting format.

23. A method comprising:
receiving a request for a content list from a first user device at a communication interface device;
determining acceptable content parameters for the first user device;
retrieving a complete list of content available for transfer;
determining from the complete list of content, a secondary list of content corresponding to content that the communication interface device can convert into content within the acceptable content parameters or that the communication interface device can pass through unconverted that has the acceptable content parameters; and
communicating the secondary list to the first user device;
receiving a content selection corresponding to content on the secondary content list;
initiating a transfer of content corresponding to the content selection from a content storage device remotely located from the first user device and the communication interface device to the communication interface device through a network;
receiving the content at the communication interface device from the content storage device through the network; and
communicating the content to the first user device from the communication interface device through the network.

24. A communication interface device comprising:
one or more processors executing modules including:
a protocol recognition module distinguishing first protocol communication signals and second protocol communication signals, said protocol recognition module forwarding communication signals having a first protocol and processing communication signals having a second protocol;
a communication module receiving a request for a content list from a first user device;
a list module generating a content list;

said communication module communicating the content list to the first user device and receiving a content selection from the user device;

a control module initiating a transfer of content corresponding to the content selection from a content storage device;

said communication module receiving the content at the communication interface device from the content storage device and communicating the content to the first user device.

25. A communication interface device as recited in claim 24 wherein the second communication protocol comprises a Universal Plug and Play protocol.

26. A communication interface device as recited in claim 24 wherein the first protocol comprises an Internet protocol.

27. A communication interface device as recited in claim 24 further comprising an encryption module encrypting the content communicated to the first user device.

28. A communication interface device as recited in claim 24 further comprising a transformation module transforming the content prior to communicating the content to the first user device.

29. A communication interface device as recited in claim 28 wherein the transformation module comprises a transcoding module for transcoding the content.

30. A communication interface device as recited in claim 28 wherein the transformation module comprises a transrating module for transrating the content.

31. A communication interface device as recited in claim 28 wherein the transformation module comprises a transcryption module for transcrypting the content.

32. A communication interface device as recited in claim 28 wherein the transformation module comprises a transcryption module for transcrypting the content and a transcoding module for transcoding the content.

33. A communication interface device as recited in claim 24 wherein the list module generates the content list from external network sources.

34. A communication interface device as recited in claim 24 wherein the list module generates the content list from internal network sources.

35. A communication interface device as recited in claim 24 wherein the list module generates the content list from external network sources and internal network sources.

36. A system comprising:
a first user device;
a content storage device;
a router in communication with the first user device and the content storage device; and
the communication interface device as recited in claim 24.

37. A system as recited in claim 36 wherein the first user device comprises a set top box.

38. A system as recited in claim 37 wherein content storage device comprises a media server in communication with the communication interface device through an internal network.

39. A system as recited in claim 36 wherein the first user device comprises a mobile device.

40. A system as recited in claim 36 wherein the content storage device comprises a media server.

41. A system as recited in claim 36 wherein content storage device comprises a web server in communication with the communication interface device through an external network.

42. A system comprising:
a first user device assigned a first IP address;
a content storage device;
a router assigned a second IP address in communication with the first user device and the content storage device; and
a communication interface device having a user device interface assigned the second IP address and a router interface assigned the first IP address;
the communication interface comprising,
a communication module receiving a request for a content list from a first user device;
a list module generating the content list;
said communication module communicating the content list to the first user device and receiving a content selection from the user device;
a control module initiating a transfer of content corresponding to the content selection from a content storage device;
said communication module receiving the content at the communication interface device from the content storage device and communicating the content to the first user device,
wherein the modules of the communication interface are executed by one or more processors.

43. A system comprising:
a first user device;
a content storage device;
a router in communication with the first user device and the content storage device; and
a communication interface device determining acceptable content parameters for the first user device, retrieving a complete list of content available for transfer with the content parameters, determining from the complete list of content, a secondary list of content corresponding to content that the communication interface device can convert into the content parameters or that the interface device can pass through unconverted that has acceptable content parameters for the first user device;
said communication interface device communicating the secondary list to the first user device;
said communication interface device comprising a communication module receiving a request for the content list from a first user device;
said communication interface device comprising a list module generating the content list;
said communication module communicating the content list to the first user device and receiving a content selection from the user device;
said communication interface device comprising a control module initiating a transfer of content corresponding to the content selection from a content storage device;
said communication module receiving the content at the communication interface device from the content storage device and communicating the content to the first user device, wherein the modules of the communication interface are executed by one or more processors.

* * * * *